US00RE34087E

United States Patent [19]

Redmond

[11] E Patent Number: Re. 34,087

[45] Reissued Date of Patent: Oct. 6, 1992

[54] ASYMMETRIC STRESS CONCENTRATOR FOR A DISPENSER PACKAGE

[76] Inventor: Sanford Redmond, 746 Riverbank Rd., Stamford, Conn. 06903

[21] Appl. No.: 448,809

[22] Filed: Dec. 11, 1989

Related U.S. Patent Documents

Reissue of:

[64] Patent No.: 4,724,982
Issued: Feb. 16, 1988
Appl. No.: 944,270
Filed: Dec. 18, 1986

[51] Int. Cl.[5] ..... B65D 75/60; B65D 47/10

[52] U.S. Cl. ..... 222/94; 222/541; 222/107; 206/469

[58] Field of Search ..... 222/92, 94, 107, 541, 222/129; 206/219, 221, 469, 532, 568, 634, 484, 824; 401/132, 196

[56] References Cited

U.S. PATENT DOCUMENTS

| | | | |
|---|---|---|---|
| 2,103,389 | 12/1937 | Salfisberg | 222/107 |
| 2,499,313 | 2/1950 | Hoag | 206/620 |
| 2,864,108 | 12/1958 | Johnson | 401/262 |
| 2,956,710 | 10/1960 | O'Connor | 222/107 |
| 3,472,368 | 10/1969 | Hellstrom | 206/469 |
| 3,521,805 | 7/1979 | Ward | 206/539 |
| 3,635,376 | 1/1972 | Hellstrom | 222/107 |
| 3,741,384 | 6/1973 | Cloud | 206/461 |
| 3,986,640 | 10/1976 | Redmond | 222/92 |
| 4,023,675 | 5/1977 | Claasen | 206/219 |
| 4,130,245 | 12/1978 | Bryson | 239/34 |
| 4,236,652 | 12/1980 | Beguhn | 222/92 |
| 4,341,302 | 7/1982 | Baker | 206/219 |
| 4,402,402 | 9/1983 | Pike | 206/219 |
| 4,493,574 | 1/1985 | Redmond | 401/132 |
| 4,608,043 | 8/1986 | Larkin | 604/87 |
| 4,664,257 | 5/1987 | Nilson | 206/219 |

FOREIGN PATENT DOCUMENTS

| | | |
|---|---|---|
| P2232861 | 6/1973 | Fed. Rep. of Germany . |
| 2161453 | 7/1973 | France . |
| 59-103866 | 6/1984 | Japan . |
| 61-104973 | 5/1986 | Japan . |

*Primary Examiner*—Michael S. Huppert
*Assistant Examiner*—Anlhoula Pomrening
*Attorney, Agent, or Firm*—Morgan & Finnegan

[57] ABSTRACT

A dispenser package comprising a relatively stiff flat sheet including a tough, high barrier layer secured to at least one surface thereof, a flexible sheet secured to one side of the relatively stiff sheet to form an enclosed flexible pouch or chamber adjacent the relatively stiff sheet, a cut pattern or fault line or other fault area scored or otherwise formed in the relatively stiff sheet generally along the transverse center line thereof, and at least one asymmetric protrusion displacing at least a portion of the fault line or fault pattern of the relatively stiff sheet, said protrusion preferably comprising an asymmetrical substantially semi- or split pyramidal shape. In preferred embodiments, a duplex or multiplex dispenser package is provided, including at least two adjacent but separate pouches or chambers secured to the relatively stiff sheet, and at least two substantially semi- or split pyramidally shaped, stress concentrating protrusions, at least one of said protrusions located above the along the inner edge of each separate pouch or chamber. Alternatively, the duplex or multiplex package is formed by interconnecting one or more individual dispenser packages.

18 Claims, 3 Drawing Sheets

ASYMMETRIC STRESS CONCENTRATOR FOR A DISPENSER PACKAGE

Matter enclosed in heavy brackets [ ] appears in the original patent but forms no part of this reissue specification; matter printed in italics indicates the additions made by reissue.

RELATED APPLICATIONS AND PATENTS

The dispenser package structures disclosed in this application represent improvements of or improved additions to the structures disclosed in Redmond U.S. Pat. No. 3,986,640, issued Oct. 19, 1976, Redmond et al. U.S. Pat. No. 4,493,574 issued Jan. 15, 1985, and Redmond U.S. Pat. No. 4,611,715 issued Sep. 16, 1986, the disclosures of which are hereby incorporated by reference.

BACKGROUND AND OBJECTS OF THE INVENTION

1. Field of the Invention

The present invention relates to a dispenser package for flowable products and the like and, more specifically, to a new configuration and structure of a stress concentrator for a dispenser package which contains and dispenses a quantity of flowable product normally called for in a single use.

2. Description of the Prior Art

Various attempts have heretofore been made to provide a dispenser package into which a flowable product may be packaged in the quantity normally required for a single use, and from which such flowable material may be dispensed.

The Redmond U.S. Pat. No. 3,986,640, (hereinafter the 640 patent) discloses a dispenser package which represents a marked improvement over prior package structures in that it accomplishes efficient dispensing of a predetermined quantity of the contents with a one handed motion and without presenting the opening difficulties previously associated with opening by removal of a cover or tearing of an envelope or pouch.

The Redmond et al U.S. Pat. No. 4,493,574 discloses a dispenser package similar to that of the Redmond 640 patent but includes the use of at least one stress concentrating protrusion member displacing at least a portion of the fault line or fault pattern out of the plane of the relatively stiff member. The preferred embodiment of the protrusion member there disclosed has a substantially pyramidal shape which displaces the fault across the apex thereof and is substantially symmetrical with respect to both the fault line.

While the aforesaid structures of the 574 patent represent a marked improvement over both the 640 patented structure and all previously known dispenser package structures, it has been found that the use of a generally symmetrically positioned stress concentrating protrusion member may suffer certain drawbacks under certain conditions.

Thus, it has been found that the relative (i) height of the symmetrical protrusion member, (ii) thickness of the sheet material, (iii) desired opening size and (iv) included angle between the symmetrical sides of the stress concentrator along a line normal to the fault line are interdependent—i.e., as the desired opening size becomes larger, the height of the protrusion member necessarily becomes greater and the walls therefore become thinner and the aforesaid included angle is and to an axis or line normal to the fault line. reduced. Consequently, as the desired opening size becomes larger, the thickness of the sheet material must be increased so that the walls of the protrusion member retain sufficient thickness to retain barrier qualities along the fault line, particularly at its peak, as well as to retain enough strength so as not to collapse, but rupture, upon bending of the relatively stiff flat sheet into a "V" shape in order to dispense the contents of the package.

It is also not always possible to simply decrease the height of the protrusion member as the width of the opening becomes greater since it also has been found that, if too shallow for a given width, the protrusion member will then flatten and lose its stress concentrating ability, resulting in an inability to rupture to open the package upon bending of the package into the "V" shape.

A further drawback of the required increase in height of the protrusion member as the opening size increases is that it may result in a lessened ability to compactly store and ship the packages or make such storage and shipment more difficult.

Finally, there are certain products which are mixed or otherwise combined at the time of use but which must be kept isolated prior to use, such as epoxy mixes and dental products, and other products which it is desirable to store separately and mix or combine at the time of use, such as salad dressings (e.g., oil and vinegar), peanut butter and jelly, etc. For these products, it would be desirable to connect two or more isolated dispenser package structures as disclosed in the 574 patent in side-by-side relationship with a protrusion member located above each pouch or chamber. However, it has been found that in such a package configuration the generally symmetrical protrusion member disclosed in the 574 patent suffers the further drawback that the resultant openings may be spread farther apart than may be desirable for conveniently combining the products upon rupture of the protrusion members.

3. Objects of the Invention

It is therefore an object of this invention to provide a new and improved dispenser package for flowable products.

Another object of this invention is to provide a new and improved dispenser package for flowable products which overcomes the aforesaid drawbacks of the generally symmetrical protrusion members disclosed in the aforesaid 574 patent.

Another object of this invention is to provide a new and improved stress concentrating means for rupturing tough materials or combinations thereof in a dispenser package upon their being bent into a "V" shape and which permits use of a thinner, and therefore more econimcal, relatively stiff flat sheet material.

Another object of this invention is to provide a new and improved dispenser package for flowable products in which the stress concentrating protrusion member is asymmetrical about a line or axis normal to the fault line or fault pattern.

A further object of this invention is to provide a new and improved dispenser package which may be combined into a duplex or multiplex package for flowable products which require isolation prior to use.

A further object of this invention is to provide a new and improved dispenser package which simultaneously dispenses two or more discrete flowable products which are isolated from each other prior to being dispensed.

A still further object of this invention is to provide a new and improved duplex or multiplex dispenser package which improves prior dispenser packages in the containment of at least two discrete flowable substances which are isolated from each other until the time of application, by providing closely spaced asymmetric protrusion members which displace the fault line or fault pattern out of the plane of the relatively stiff sheet member and which rupture the fault upon bending to produce at least two separate but closely spaced openings through which the aforesaid flowable substances are separately and simultaneously dispensed.

A still further object of this invention is to provide a new and improved dispenser package which improves prior dispenser packages for the containment of flowable products by forming the stress concentrating protrusion member in the shape of a substantially semi- or split pyramidal configuration which displaces the fault line or fault pattern out of the plane of the relatively stiff sheet member and is positioned so as to be substantially symmetrical to the fault but asymmetrical to a line or axis normal to the fault.

A still further object of this invention is to provide a new and improved duplex or multiplex dispenser package which accurately dispenses unequal quantities of two or more flowable products.

Objects and advantages of the invention are set forth in part herein and in part will be obvious therefrom, or may be learned by practice with the invention, the same being realized and attained by means of the instrumentalities and combinations pointed out in the appended claims.

The invention consists of the novel parts, constructions, arrangements, combinations, steps and improvements herein shown and described.

SUMMARY OF THE INVENTION

Briefly described, the present invention is directed to a new and improved dispenser package for flowable products which may be opened by one hand in a manner to cause controlled rupturing of various packaging materials, ranging from low cost, easily ruptured materials such as polystyrene to tough, high barrier web materials, such as a single layer or laminates or co-extrusions containing such plastics as polyester, polypropylene or nylon, and which can reduce costs of the packaging materials as well as provide an improved duplex or multiplex multiple chamber package.

In accordance with a preferred embodiment of the present invention, the dispenser package comprises a relatively stiff flat sheet having a tough, high barrier layer secured to at least one surface thereof, a flexible sheet secured to said one surface of the relatively stiff sheet to form an enclosed pouch adjacent the relatively stiff side, a cut pattern or fault line or other fault area scored or otherwise formed in the relatively stiff sheet generally along the transverse center line thereof, and at least one stress concentrating protrusion member displacing at least a portion of the fault line or fault pattern of the relatively stiff sheet, said protrusion member preferably comprising a substantially semi- or split pyramidal shape.

Advantageously, the aforesaid preferred semi- or split pyramidal shape is positioned asymmetrically to a line perpendicular to the fault line, and includes a substantially vertical wall extending in a direction perpendicular to the fault line and projecting upwardly from the relatively stiff flat sheet to the apex of the substantially semi- or split pyramid. It has been found that the aforesaid substantially semi- or split pyramidal configuration, as well as the various alternative semi- or split configurations hereinafter described, can have certain surprising and unexpected advantages over the various substantially symmetrical protrusion configurations disclosed in the aforesaid 574 patent. Thus, it has been surprisingly found that the semi- or split protrusion configurations provide adequate strength to rupture even high strength barrier materials without collapse of the protrusion, and can do so utilizing even slightly thinner gauge materials than would be required by a symmetrically shaped protrusion member for a comparably sized opening, providing savings on the order of approximately 10% in material costs.

While I do not wish to predicate this result on any one particular theory, I believe the substantially vertical wall serves as a columnar support element which prevents the angled side walls of the protrusion members from collapsing even where the protrusion walls are slightly thinner than in the substantially symmetrical configurations.

While the opening formed upon rupture of the substantially semi- or split protrusion configurations of the present invention is, for the same height and included wall angle, smaller than the opening formed by a substantially symmetrical configuration, this can be advantageous when the product being dispensed has low viscosity, e.g., rubbing alcohol, soy sauce, etc. Thus, where the desired opening size is small, the dimensions of a substantially symmetrical protrusion member become extremely small, approximately one-half the size of the protrusion member of the present invention, requiring more precision and accuracy in their manufacture, with attendant additional expense.

In accordance with a still more preferred embodiment of the present invention, a duplex or multiplex dispenser package is provided which comprises at least two closely adjacent separately enclosed pouches or chambers, each chamber having one side facing the relatively stiff flat sheet, and at least two stress concentrating asymmetrical protrusion members, each positioned above an enclosed pouch or chamber and each displacing at least a portion of the fault line or fault pattern out of the plane of the relatively stiff flat sheet in a direction away from its associated enclosed chamber. Advantageously, each asymmetrical protrusion member comprises a substantially semi- or split pyramidal shape positioned substantially symmetrical to the fault line or pattern but asymmetrical to a line perpendicular to the fault, with the substantially vertical wall thereof extending in a direction perpendicular to the fault and projecting upwardly from the relatively stiff flat sheet to the apex of the semi- or split pyramidal shape.

It will be seen from the foregoing that the multiple chamber arrangement of the latter embodiment provides a dispenser package which may contain at least two discrete flowable substances which are isolated from each other prior to use but which are opened and dispensed essentially simultaneously from the two separate openings formed by rupture of the protrusion members upon bending of the package into a "V" shape.

Advantageously, and preferably, the aforesaid two substantially semi- or split pyramidal protrusion members are positioned such that the substantially vertical walls thereof are in closely spaced facing relationship.

Unexpectedly, it has been found that such a duplex or multiple chamber package can be constructed so that, upon rupture of said protrusion members, the separately contained flowable substances are dispensed in either a single stream or in two closely spaced streams that are easily directed into contact with each other.

As used herein, the terms "fault line" or "fault pattern" are intended to encompass the aforesaid alternatives of a cut pattern, a single straight line extending across a portion or all of the relatively stiff flat sheet or a fault area formed by weakening means other than by a scored continuous line.

In each of the curvilinear and straight-edged elongated substantially pyramidal shapes described, the shorter axis of the pyramidal configuration preferably is in the same line as the fault line or fault pattern.

It will be apparent from the foregoing general description that the objects of the invention specifically enumerated herein are accomplished by the invention as here embodied.

Thus in accordance with the preferred embodiments of the invention, it has been found that a dispenser package constructed of high strength, high quality barrier material may be opened by rupture of an asymmetrical stress concentrating protrusion member and can be constructed more economically utilizing thinner gauge materials than those utilized to construct prior dispenser packages having substantially symmetrical protrusion members. In addition, it has been found that asymmetrical stress concentrating protrusion members enable duplex or multiple chamber dispenser packages to be more advantageously constructed such that the separately dispensed flowable products are more easily contacted or otherwise used.

It will be understood that the foregoing general description and the following detailed description are exemplary and explanatory of the invention but are not restrictive thereof.

The accompanying drawings referred to herein and constituting a part hereof, illustrate preferred embodiments of the present invention, and together with the description serve to explain the principles of the invention.

DESCRIPTION OF THE PREFERRED EMBODIMENTS

Figure 1:
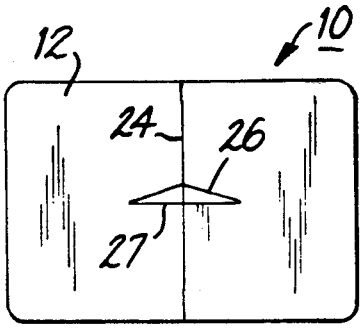
FIG. 1 is a top plan view of a dispenser package constructed in accordance with the present invention in its pre-opened condition, the view showing one generally elongated substantially semi- or split pyramidal shaped stress concentrating protrusion member extending from the relatively stiff side thereof, the protrusion member having its short axis positioned along a fault line.
Figure 2:
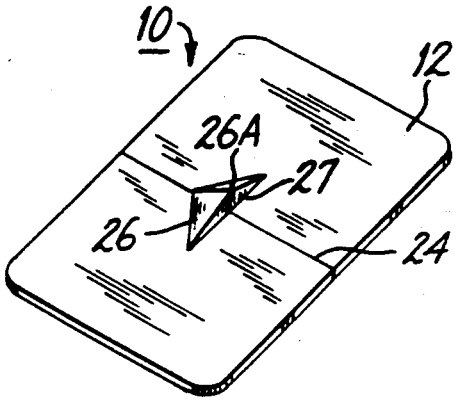
FIG. 2 is a view in perspective of the dispenser package shown in FIG. 1.
Figure 3:
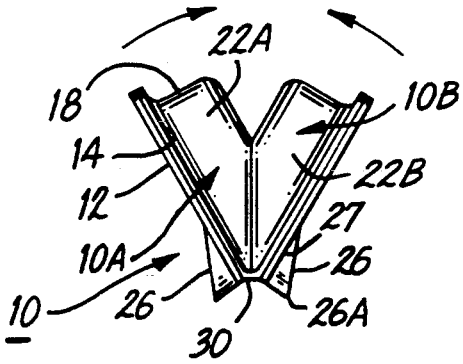
FIG. 3 is a view in side elevation of the dispenser package shown in FIG. 1 illustrating the package after bending and rupture at the fault line.

Referring now more particularly to FIGS. 1 through 3 of the accompanying drawings, there is illustrated a dispenser package constructed in accordance with the preferred embodiment of the present invention, indicated generally by reference numeral 10.

As here embodied, package 10 includes a relatively stiff and relatively flat sheet 12 and flexible sheet 18 suitably secured to the outer margins of one face of flat sheet 12, flexible sheet 18 forming at least one pouch or chamber adjacent the aforesaid one face of flat sheet 12 for containing a flowable substance.

Advantageously, and as here preferably embodied, a layer of a suitable sealant/vapor impervious barrier material 14 is suitably integrally bonded to flat sheet 12 on the side thereof which faces flexible sheet 18. Flexible sheet 18, advantageously formed by conventional means, such as vacuum forming, pressure forming, mechanical forming or combinations thereof, is likewise suitably integrally bonded to sheet 12 or laminate 12, 14, as the case may be.

The bonds between relatively stiff flat sheet 12, sealant/barrier material 14 and flexible side 18 also may be formed by conventional means known to persons of ordinary skill in the packaging art, such as welding, heat sealing, or adhesive or cohesive bonding, the particular bonding method selected depending upon the particular properties of the materials used and the flowable substance(s) to be contained.

Advantageously, and as preferably embodied, relatively stiff flat sheet 12 is made of polystyrene or polyester or a copolymer thereof, and barrier 14 is made of a suitable sealant/vapor impervious barrier material comprising saran and foil laminate, or comprising a laminate of foil and vinyl, or foil alone, depending upon the nature of the contents to be contained. A particularly tough, high barrier construction comprises saran laminated on each side with polyethylene (sold by Dow Chemical Co. under the name "Saranex") as the barrier sheet 14, in turn laminated onto polystyrene or polyester, forming the relatively stiff flat sheet 12.

It will be understood to those of ordinary skill in the art that the bonds formed between materials 12, 14 and 18 can be obtained by the conventional means previously described, again depending upon the nature of the flowable substance being contained. These and other equivalent materials and bonding systems are described in the aforementioned 640 and 574 patents, the disclosures of which are hereby incorporated by reference.

Figure 4:
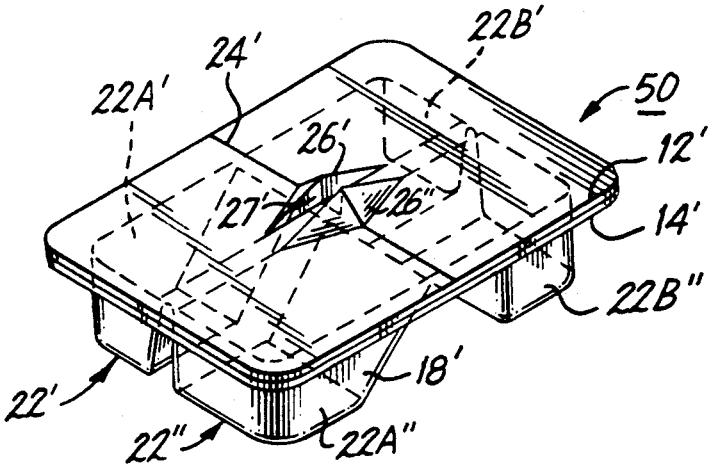
FIG. 4 is a view in perspective of a duplex dispenser package constructed in accordance with a preferred embodiment of the present invention, the view showing the package in its pre-opened condition.

It will be seen from the foregoing that the structure of FIGS. 1-3 forms an enclosed pouch or chamber 22 between flexible side 18 and relatively stiff flat sheet 12, 14 in which the flowable substance is contained and from which the flowable substance is dispensed. Advantageously, as best seen in FIG. 4, the enclosed pouch or chamber 22 comprises a pair of laterally spaced pockets 22A, 22B interconnected by a shallow duct or channel, more fully described in the aforesaid Redmond 715 patent.

Relatively stiff flat sheet 12 of dispenser package 10 is provided with a fault line 24, preferably scored on the outer surface thereof facing away from enclosed pouch 22. As previously mentioned, it will be understood that the present invention is not limited to a linear fault pattern, but rather, the term fault line is intended to encompass various fault patterns or weakened areas which may be employed to obtain particular desired results.

In accordance with the invention, dispenser package 10 is provided with one or more asymmetrical stress concentrating protrusion members 26 formed along fault line 24, projecting outwardly from the outer surface of relatively stiff flat sheet 12 or laminated sheet 12,14. As here preferably embodied, protrusion 26 is formed in the shape of a substantially semi- or split pyramidal configuration positioned so that fault line 24 is displaced across apex 26A of protrusion 26. Protrusion 26 preferably has a substantially vertical wall 27 extending in a direction perpendicular to fault line 24 and projecting upwardly from the relatively stiff flat sheet 12 to apex 26A. It will be understood from the foregoing, and as best seen in FIGS. 1 and 2, that protrusion 26 is symmetrical to fault 24 but asymmetrical to a line or axis normal to fault 24.

It will be seen from the foregoing, and as described in more detail in the aforesaid Redmond et al 574 patent, that fault line 24 acts as a guide for controlled rupture of relatively stiff flat sheet 12 as package 10 is bent into a "V" shape about fault 24. As relatively stiff flat sheet 12 is bent into a "V" shaped configuration, stress is concentrated or focused at apex 26A of protrusion 26 by leverage attributable to the distance of apex 26A from the bending axis extending along the surface of relatively stiff flat sheet 12. As previously discussed, asymmetrical substantially semi- or split pyramidal protrusion 26 unexpectedly focuses bending stress at the apex 26A in a manner similar to the symmetrical protrusion shapes disclosed in the 574 patent and yet, believed to be due to the columnar effect of the vertical wall 27, unexpectedly withstands a greater force than a substantially symmetrical shape, such that sheet 12 and laminate layer 14 rupture to form an exit aperture 30.

Concurrent with the rupture of apex 26A and protrusion 26, fault 24 also ruptures. However, as pointed out in the aforesaid Redmond et al 574 patent, here too, when material 14 is formed of a tough, high barrier construction, the stress exerted along fault line 24 during rupture is not sufficient to rupture this barrier material, with the result that it serves to hinge stiff sheet 12 together except where it has been ruptured by a protrusion 26. Thus, as the two side halves 10A, 10B of package 10 are forced toward a parallel and overlapping position, the side halves 10A, 10B cooperate with flexible sheet 18 forming pouch or chamber 22 to force the contained flowable substance through exit aperture 30. Since the barrier material 14 has not ruptured along fault line 24 except along protrusion 26, exit aperture 30 is the only opening from which the contained flowable substance can exit.

It will be apparent from the foregoing that the localized opening created at exit aperture 30 develops a highly directed stream of the flowable substance as the rigid side halves 10A, 10B act cooperatively with flexible side 18 to expel the contents from pouch 22.

It will be understood that the same effect as just described may be obtained by forming the fault line 24 substantially only across protrusion 26. Alternatively, fault line 24 may extend beyond protrusion 26 but not to the edges of the package.

Figure 5:
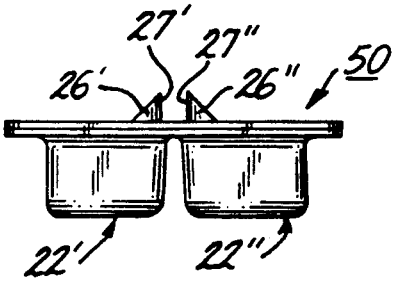
FIG. 5 is a view in end elevation of the duplex dispenser package shown in FIG. 4.
Figure 6:
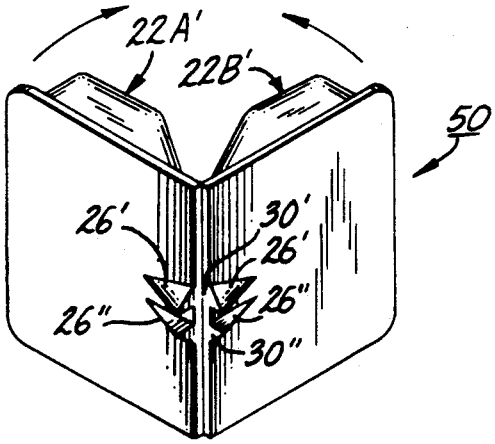
FIG. 6 is a perspective view of the duplex dispenser package shown in FIG. 4, this view illustrating the package after bending and rupture of each of the substantially semi- or split pyramidally shaped stress concentrating protrusion members.

Referring now more particularly to FIGS. 4-6 of the accompanying drawings, there-is shown a preferred embodiment of the dispenser package construction of FIGS. 1-3, indicated generally by reference numeral 50.

As best seen in FIGS. 4 and 5, package 50 advantageously may comprise a relatively stiff substantially flat laminated sealant/barrier sheet 12',14', a flexible sheet 18' secured to one face of the sheet 12',14', a pair of opposed, closely spaced substantially semi- or split pyramidally shaped stress concentrating protrusion members 26',26'', and a fault line or pattern 24', all as previously described. As here preferably embodied, however, flexible sheet 18 is formed into two separately enclosed, closely adjacent pouches or chambers 22',22'', to thereby form a "duplex" dispenser package. Advantageously, each pouch or chamber 22',22'' comprises a pair of laterally spaced pockets 22A',22B' and 22A'',22B'' interconnected by a shallow duct or channel, also in the manner previously described. As will be seen, protrusion member 26' is positioned above pouch 22' and member 26'' is positioned above pouch 22''. Advantageously, and as illustrated, protrusion members 26',26'' are positioned with their respective substantially vertical wall elements 27',27'' in opposed facing relationship closely adjacent the inner edges of their respective pouches 22',22'', thereby enabling the protrusion members to be spaced apart only a very small distance, on the order of 1/16" or less.

It will be understood from the foregoing, and as illustrated in FIG. 6, that duplex dispenser package 50 is capable of both (i) containing two separate and distinct products isolated from each other prior to use and, (ii) essentially simultaneously opening, dispensing and mixing or combining the products upon bending the ends of the package into a "V" shape and rupturing protrusions 26',26'' to form openings 30',30'', respectively.

It will be understood that the construction of relatively stiff flat sheet 12 or 12' in either of the aforedescribed embodiments may be advantageous even when no extra sealant or barrier material 14 or 14' is required, and such construction is within the scope of the present invention. As previously described in connection with the use of a localized fault line, such a construction may be particularly desirable in dispensing low viscosity flowable substances such as water, cream or alcohol in a highly directed stream from an essentially dripless package. Such flowable substances do not require a special sealant/barrier layer and yet are appropriate substances for a dispenser having the other advantages of the present invention.

Figure 7A:
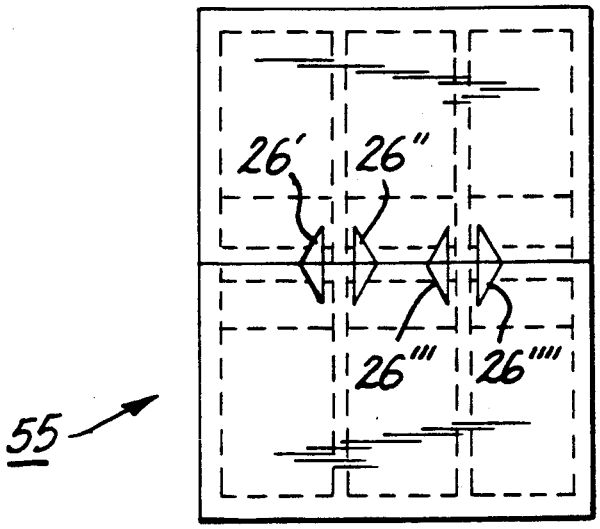
FIGS. 7A, 7B and 7C are top plan views illustrating various dispenser package constructions in accordance with the present invention, FIG. 7A illustrating a three-chambered multiplex package and, FIGS. 7B and 7C illustrating duplex packages having discrete compartments of different capacities so as to dispense unequal quantities of different products.

While the duplex package 50 shown in FIGS. 4 and 5 is constructed from a single relatively stiff and substantially flat sheet 12',14' and a single flexible sheet 18' formed into the two pouches 22',22'', it will be understand that a duplex package such as 50, or a multiplex package having three or more of such isolated compartments, shown at 55 in FIG. 7A, also may be constructed by connecting individual dispenser packages such as shown in FIGS. 1-3, with an asymmetrical stress concentrating protrusion member located along each interior edge of each isolated compartment, as shown in FIG. 7A at 26',26'',26''', 26''''. It will be seen that the stress concentrating protrusion arrangement of FIG. 7A has the further advantage of providing two double streams of directed flow upon rupture.

Figure 7C:
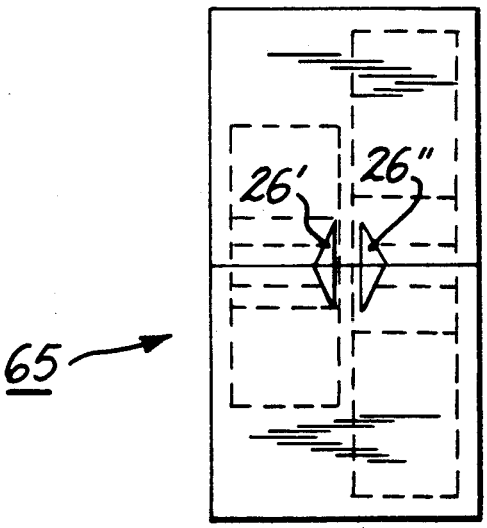
Figure 7B:
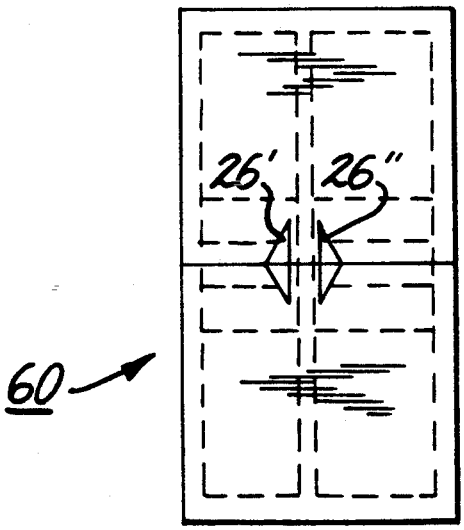

FIGS. 7B and 7C illustrate still further advantageous arrangements for a duplex dispenser package constructed in accordance with the present invention. Thus, in FIG. 7B there is shown a duplex package 60 having two separate compartments of equal length but unequal width, and in FIG. 7C there is illustrated a package 65 having two separate compartments of equal width but unequal length. It will be seen that these embodiments of the invention have the further advantage that unequal quantities of different products may be separately stored and yet may be dispensed both accurately and essentially simultaneously.

Figure 8A:
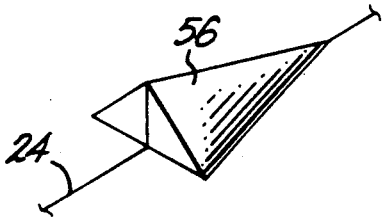
FIGS. 8A, 8B and 8C are fragmentary schematic views of alternative embodiments of the asymmetric shape of the stress concentrating protrusion member of the present invention, FIG. 8A illustrating an elongated semi- or split pyramidal protrusion formed so that its long axis is on the fault line, FIG. 8B illustrating a semi- or split domed shape, and FIG. 8C illustrating a semi- or split conical shape.
Figure 8C:
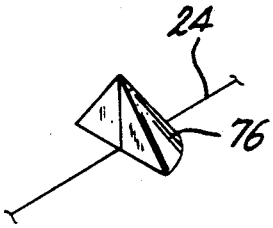
Figure 8B:
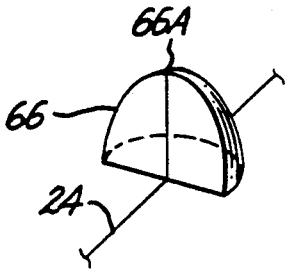

Referring now more particularly to FIGS. 8A through 8C of the accompanying drawings, there are illustrated alternative embodiments for the shape of the stress concentrating protrusion member for a dispenser package constructed in accordance with the invention.

In FIG. 8A there is shown an elongated substantially semi- or split pyramidal protrusion 56 similar to that shown in FIGS. 1 and 4, except positioned so that fault line 24 bisects protrusion 56 along its long axis. FIG. 8B shows a substantially semi- or split rounded dome-like protrusion 66. Fault line 24 bisects semi- or split domed protrusion 66 along its curved sides and across the center of its top surface 66A. FIG. 8C shows a substantially semi- or split conical protrusion 76 bisected by fault line 24.

As previously discussed, it will be seen that the structures of each of FIGS. 8A-8C concentrate the rupturing forces substantially at a point for maximum stress and rupturability and each includes a substantially vertical wall providing a columnar support element providing increased strength for a given wall thickness.

It will be understood that in each of the disclosed embodiments of the asymmetrical stress concentrating protrusion member of the present invention it is preferred that the columnar support element comprise an essentially vertical wall for greatest strength. However, it will be understood that the invention also encompasses other asymmetrical configuratious, e.g., where the included angle at the base of the wall forming one half of the protrusion is somewhere between 180° and the included angle of the wall forming the other half of the protrusion member. It will also be understood that the asymmetrical wall may be either a flat vertical wall, a wall comprised of two or more flat faces, a curvilinear wall or a combination of curvilinear and flat faces. Where the asymmetrical wall is curvilinear or a combination of curvilinear and flat faces, then the distance of the furthest point of the asymmetrical wall along the fault line is less than the distance to the furthest point of the opposing wall forming the other half of the protrusion member.

To the extent not already indicated, it also will be understood by those of ordinary skill in the art that any one of the various specific embodiments herein described and illustrated may be further modified to incorporate features shown in other of the specific embodiments, as desired.

The invention in its broader aspects therefore is not limited to the specific embodiments herein shown and described but departures may be made therefrom within the scope of the accompanying claims, without departing from the principles of the invention and without sacrificing its chief advantages.

What is claimed is:

1. A dispensing package for a flowable substance, said package including a relatively stiff substantially flat sheet, a flexible sheet secured to one face of said relatively stiff substantially flat sheet, said flexible sheet forming a pouch adjacent said one face of said relatively stiff substantially flat sheet for containing a flowable substance, said relatively stiff substantially flat sheet having a fault line of predetermined length, protrusion means displacing at least a portion of said fault line out of the plane of said relatively stiff substantially flat sheet in a direction away from said one face for substantially maximally increasing the stress in said relatively stiff substantially flat sheet at the displaced portion of said fault line, whereby upon bending said relatively stiff substantially flat sheet into a "V" about an axis extending along said fault line so that the arms of said "V" encapture said pouch, said fault line initially ruptures at the locus of said protrusion means to create at least one opening through which said flowable substance is dispensed in a directed flow, said protrusion means having a configuration which is substantially symmetrical on either side of said fault line, substantially asymmetrical on either side of an axis normal to said fault line and in which the point of greatest displacement is located substantially on said fault line.

2. A dispensing package as claimed in claim 1, wherein said relatively stiff flat sheet includes a foil barrier material.

3. A dispensing package as claimed in claim 1, wherein said relatively stiff flat sheet includes a plastic barrier material.

4. A dispensing package as claimed in claim 1, wherein said relatively stiff flat sheet includes both foil and plastic barrier materials.

5. A dispensing package as claimed in claim 1, including a plurality of said protrusion means spaced apart along said fault line to create a plurality of openings along said fault line upon bending said relatively stiff substantially flat sheet into said "V".

6. A dispensing package as claimed in claim 1, wherein said protrusion means has a peaked cross-sectional shape along said fault line.

7. A dispensing package as claimed in claim 1, wherein said flexible sheet forms at least two separately enclosed side-by-side pouches adjacent said one face of said relatively stiff substantially flat sheet, and including at least two of said protrusion means, one of which is positioned over each of said pouches, each of said protrusion means displacing at least a portion of said fault line out of the plane of said relatively stiff substantially flat sheet in a direction away from its associated pouch.

8. A dispensing package as claimed in claim 6, wherein said protrusion means has a substantially vertical wall extending perpendicular to said fault line and projecting upwardly from said relatively stiff substantially flat sheet to the apex of said protrusion means.

9. A dispensing package as claimed in claim 7, wherein said protrusion members each comprise a substantially semi-pyramidal configuration having a substantially vertical wall extending perpendicular to said fault line and projecting upwardly from said relatively stiff substantially flat sheet to the apex thereof, and said protrusion members are positioned with their respective vertical walls in closely spaced opposed facing relationship.

10. A dispensing package as claimed in claim 8, wherein said protrusion means comprises a substantially semi-pyramidal configuration and said fault line is displaced from said relatively stiff flat sheet material across the apex thereof.

11. A dispensing package as claimed in claim 8, wherein said protrusion means comprises a substantially semi-conical configuration and said fault line substantially bisects said conical configuration.

12. A dispensing package as claimed in claim 8, wherein said protrusion means comprises a substantially semi-domed configuration and said fault pattern is displaced from said relatively stiff flat sheet material across the apex thereof.

13. A dispensing package as claimed in claim 9, wherein said substantially semi-pyramidal configuration has axes of unequal length and the shorter axis extends substantially along said fault line.

14. A dispensing package as claimed in claim 9, wherein said substantially semi-pyramidal configuration has axes of unequal length, and the longer axis extends substantially along said fault line.

*15. A package comprising:*

*a lid made of a stiff material and having a fault line at the center of a first surface thereof which is adapted to open upon bending said lid along said fault line;*

*container means made of a flexible material fixed to a second surface of said lid located on the reverse side of said first surface, said container means including*

*a first pocket on one side of said fault line and a second pocket on the other side of said fault line;*

*each of said first and second pockets having a respective communication portion which communicates with a different portion of said fault line of said lid;*

*said communication portion of said first pocket not communicating with any portion of said second pocket and said communication portion of said second pocket nor communicating with any portion of said first pocket, whereby said first and second pockets are isolated from each other.*

*16. A package as claimed in claim 15, wherein portions on said fault line communicating with said communication portions of said pockets are structured so as to be opened by bending said lid.*

*17. A package as claimed in claim 15, wherein portions of said lid communicating with said communication portions of said pockets are formed as pyramidal projections along said fault line.*

*18. A package as claimed in claim 15, wherein portions of said lid communicating with said communication portions of said pockets are formed as circular truncated conical projections along said fault line.*

* * * * *